US012774920B2

(12) United States Patent
Gilbert et al.

(10) Patent No.: US 12,774,920 B2
(45) Date of Patent: Oct. 27, 2026

(54) CALCULATION MODULE FOR DETERMINING A LOCALIZATION, SYSTEM, EYEWEAR AND COMPUTER IMPLEMENTED METHOD

(71) Applicant: Essilor International, Charenton-le-Pont (FR)

(72) Inventors: Cédric Gilbert, Charenton-le-Pont (FR); Eléonore Pic, Charenton-le-Pont (FR); Alexandre Gourraud, Charenton-le-Pont (FR); Bruno Fermigier, Charenton-le-Pont (FR); Aurélie Le Cain, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 105 days.

(21) Appl. No.: 18/846,451

(22) PCT Filed: Mar. 13, 2023

(86) PCT No.: PCT/EP2023/056345
§ 371 (c)(1),
(2) Date: Sep. 12, 2024

(87) PCT Pub. No.: WO2023/186510
PCT Pub. Date: Oct. 5, 2023

(65) Prior Publication Data

US 2025/0189368 A1 Jun. 12, 2025

(30) Foreign Application Priority Data

Apr. 1, 2022 (EP) .................................... 22305434

(51) Int. Cl.
*G01J 1/42* (2006.01)
*G01J 1/44* (2006.01)
*G02C 7/10* (2006.01)

(52) U.S. Cl.
CPC ............... *G01J 1/4204* (2013.01); *G01J 1/44* (2013.01); *G02C 7/101* (2013.01); *G01J 2001/4266* (2013.01)

(58) Field of Classification Search
CPC .... G01J 1/4204; G01J 1/44; G01J 2001/4266; G01J 1/0228; G01J 1/429; G01J 1/4257; G02C 7/101; G02C 11/10
See application file for complete search history.

(56) References Cited

U.S. PATENT DOCUMENTS 4,079,388 A 3/1978 Takahama et al.
8,592,744 B2 * 11/2013 Van Dalen ............ G06F 1/1613
250/339.05

(Continued)

FOREIGN PATENT DOCUMENTS

WO WO 2018/184072 A1 10/2018
WO WO 2021/003344 A1 1/2021

OTHER PUBLICATIONS

Hossan et al. "A Novel Indoor Mobile Localization System based on Optical Camera Communication"; Wireless Coms. and Mobile Computing, vol. Jan. 2018, 2018.*

(Continued)

*Primary Examiner* — Mohamed K Amara
(74) *Attorney, Agent, or Firm* — Oblon, McClelland, Maier & Neustadt, L.L.P.

(57) ABSTRACT

A calculation module for determining a localization, system, eyewear and computer implemented method. The calculation module is configured to receive, from a spectrophotometer of an optical device, data representing a power density of at least two spectral components of a light received by the (Continued)

spectrophotometer and to determine the localization using the power density of the at least two spectral components.

12 Claims, 9 Drawing Sheets

(56) References Cited

U.S. PATENT DOCUMENTS

| | | | | |
|---|---|---|---|---|
| 10,267,677 | B1 * | 4/2019 | Sarkar | G01J 1/4204 |
| 10,345,151 | B1 * | 7/2019 | Sarkar | G01J 3/0272 |
| 10,648,858 | B2 * | 5/2020 | Lian | G01J 1/0233 |
| 11,733,092 | B2 * | 8/2023 | Pacala | G01J 1/4204 356/4.01 |
| 11,991,808 | B2 * | 5/2024 | Hung | G09G 3/32 |
| 2008/0303918 | A1 * | 12/2008 | Keithley | G09G 3/20 348/223.1 |
| 2010/0187406 | A1 | 7/2010 | Van Dalen et al. | |
| 2015/0342005 | A1 * | 11/2015 | Akcasu | H05B 47/11 315/307 |
| 2016/0041035 | A1 * | 2/2016 | Allen | G01J 1/0266 356/402 |
| 2016/0232828 | A1 * | 8/2016 | Jia | G01J 1/4204 |
| 2016/0370231 | A1 * | 12/2016 | Agahian | G09G 3/2003 |
| 2019/0154871 | A1 * | 5/2019 | Leduc | B62D 63/02 |
| 2020/0022239 | A1 | 1/2020 | Hung et al. | |
| 2020/0089023 | A1 * | 3/2020 | Zhou | G02C 11/10 |
| 2021/0248942 | A1 * | 8/2021 | Yoon | G01J 1/32 |
| 2022/0364914 | A1 | 11/2022 | Kwon et al. | |
| 2026/0036468 | A1 * | 2/2026 | Kim | G01J 3/506 |

OTHER PUBLICATIONS

International Search Report issued on Sep. 18, 2023 in PCT/EP2023/056345 filed on Mar. 13, 2023, 6 pages.

* cited by examiner

[Fig. 1]
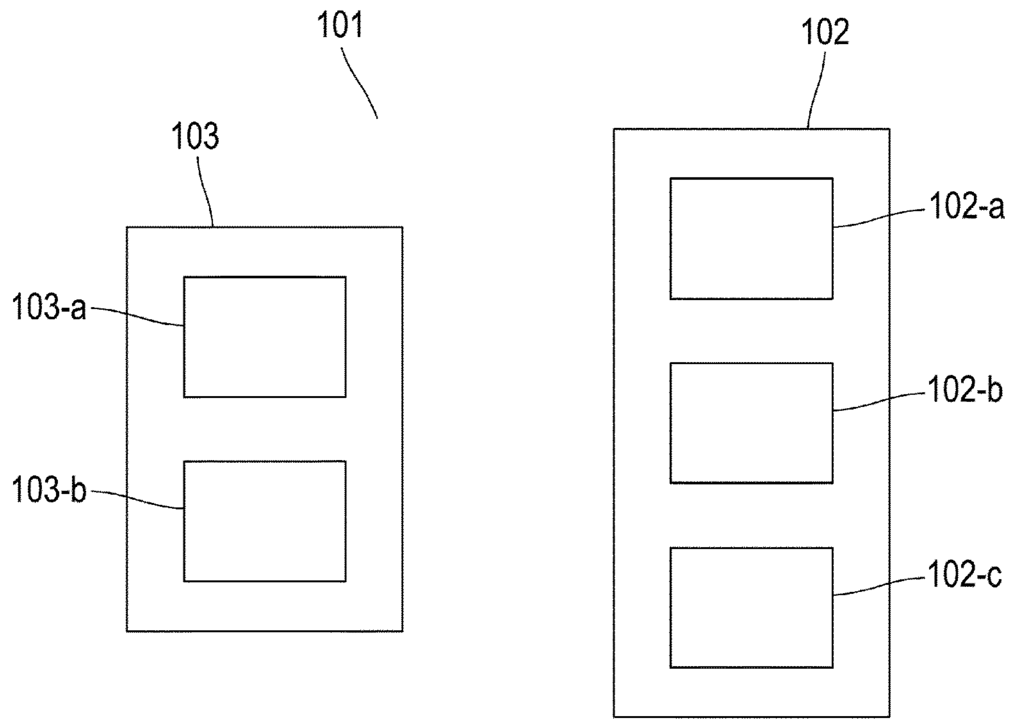
[Fig. 2]
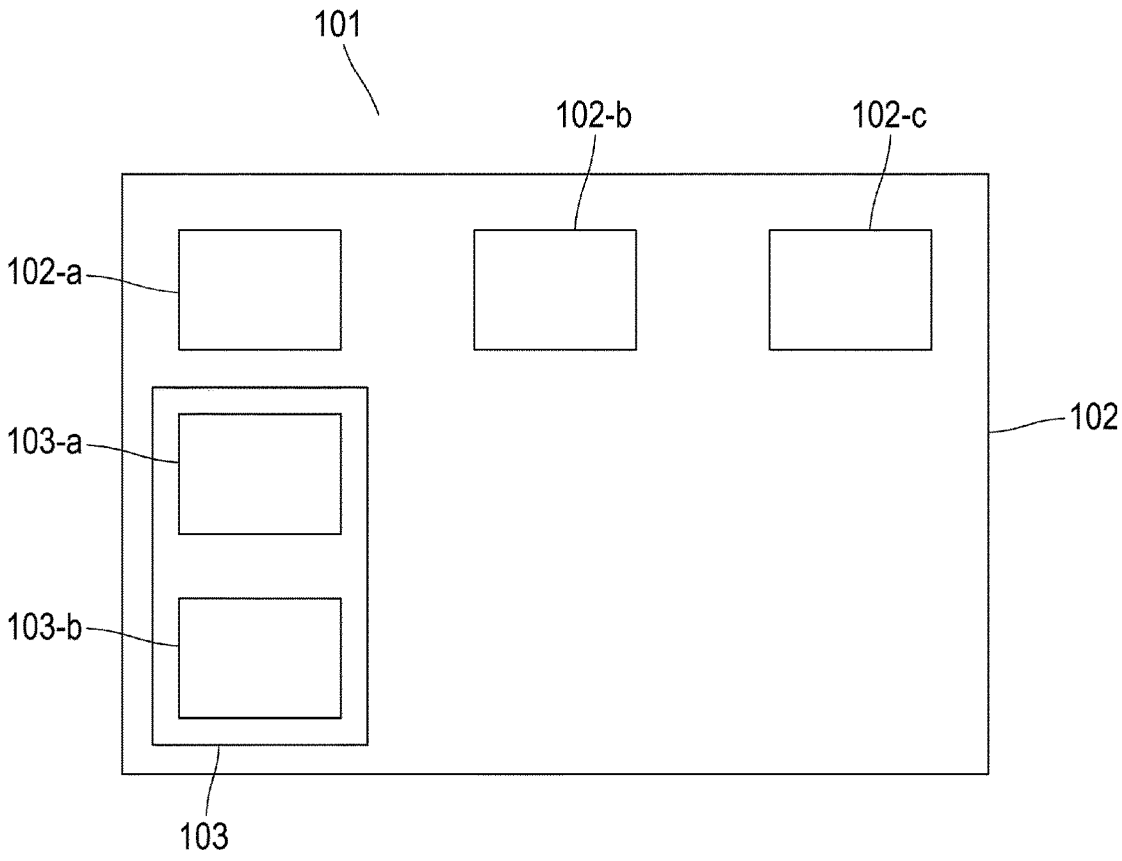

[Fig. 5]
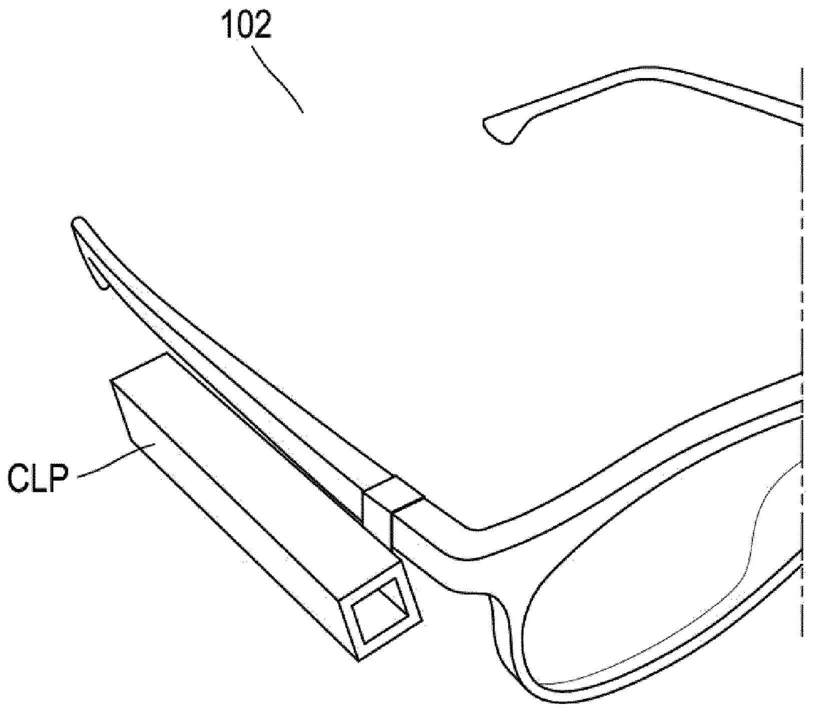
[Fig. 6]
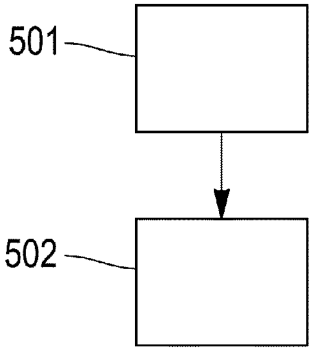

[Fig. 7]
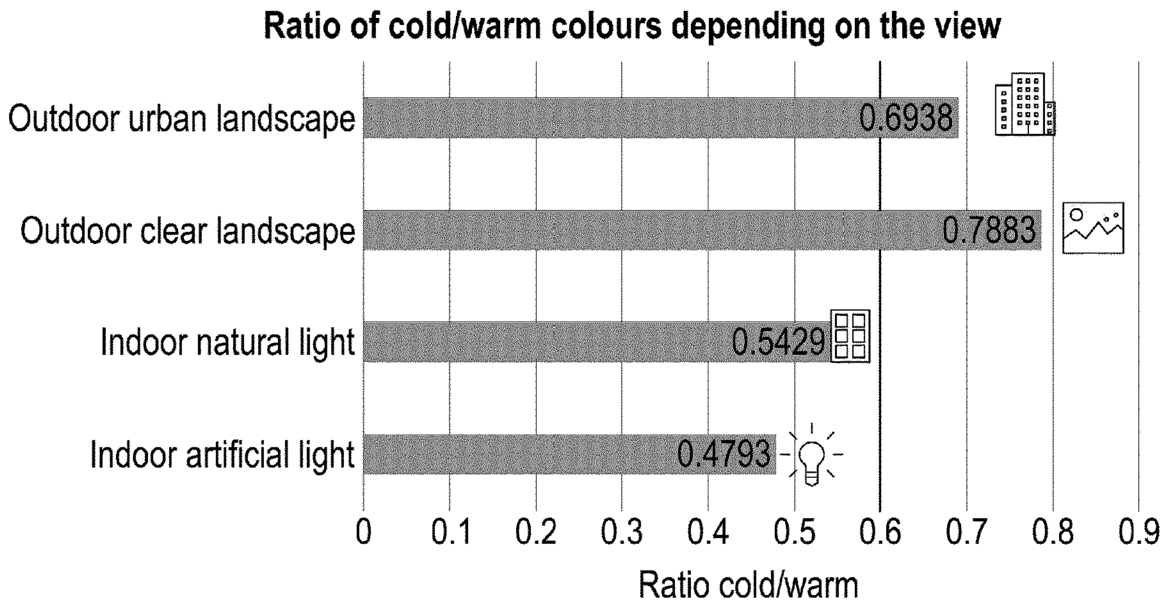
[Fig. 8]
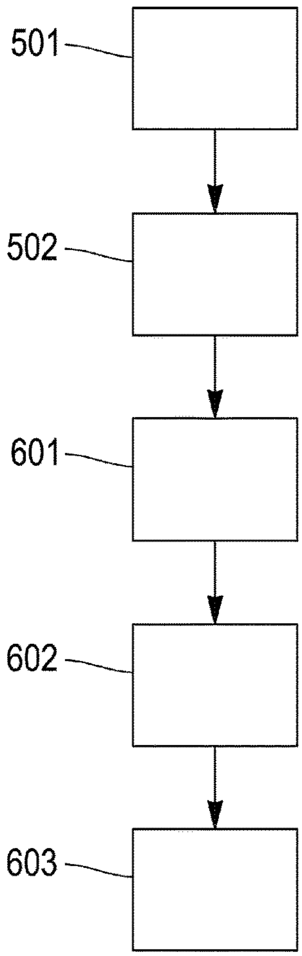

[Fig. 9a]
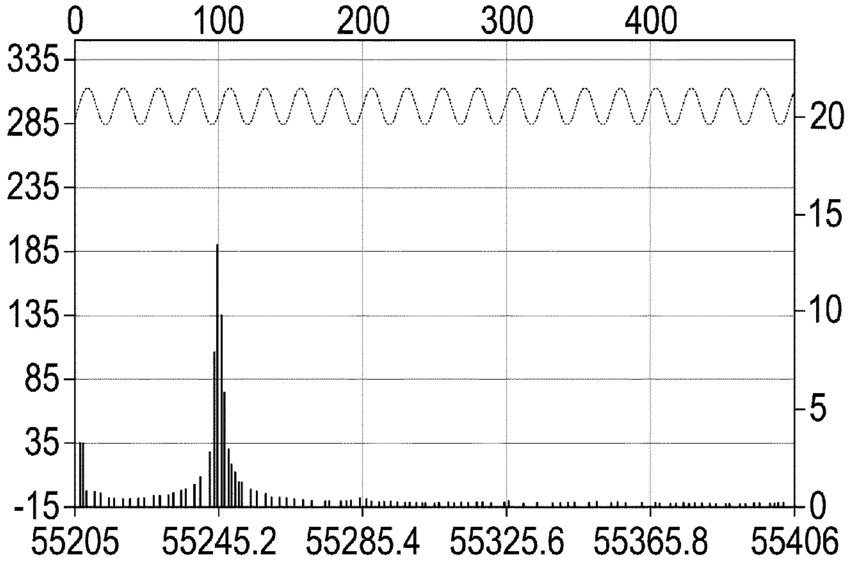
[Fig. 9b]
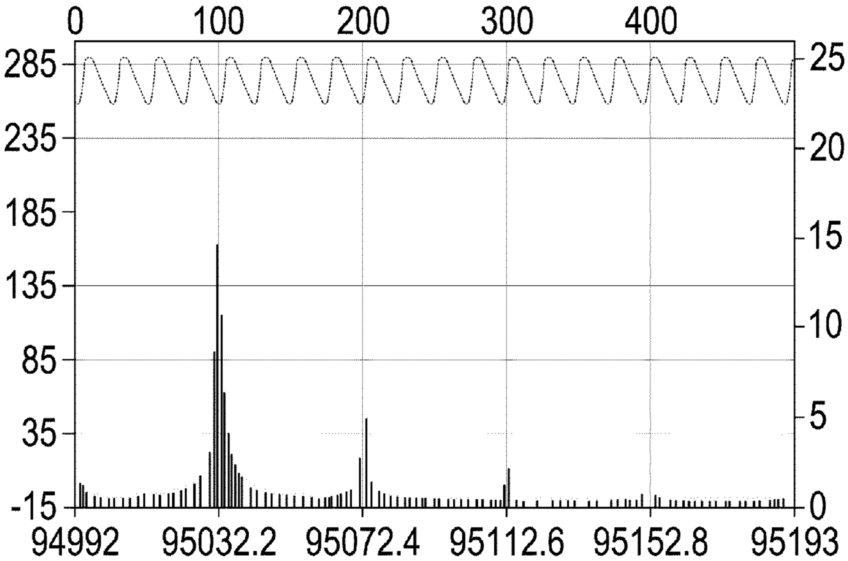

[Fig. 9c]
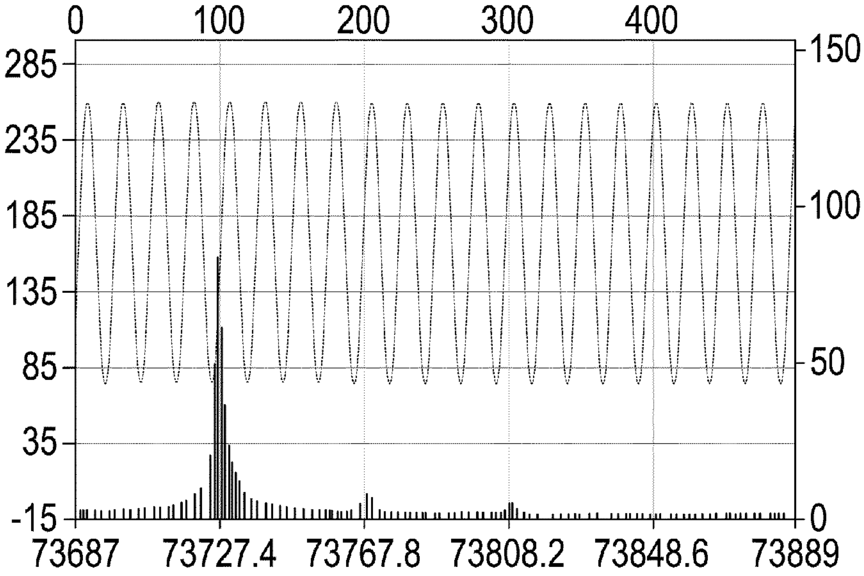
[Fig. 10]
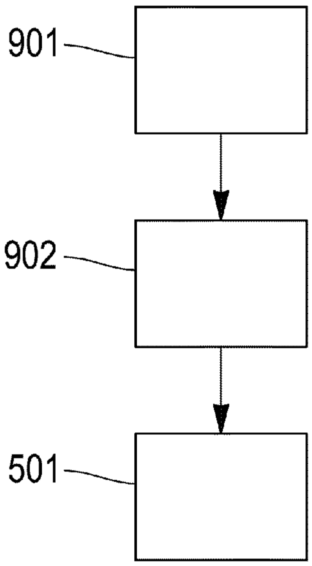

[Fig. 11]
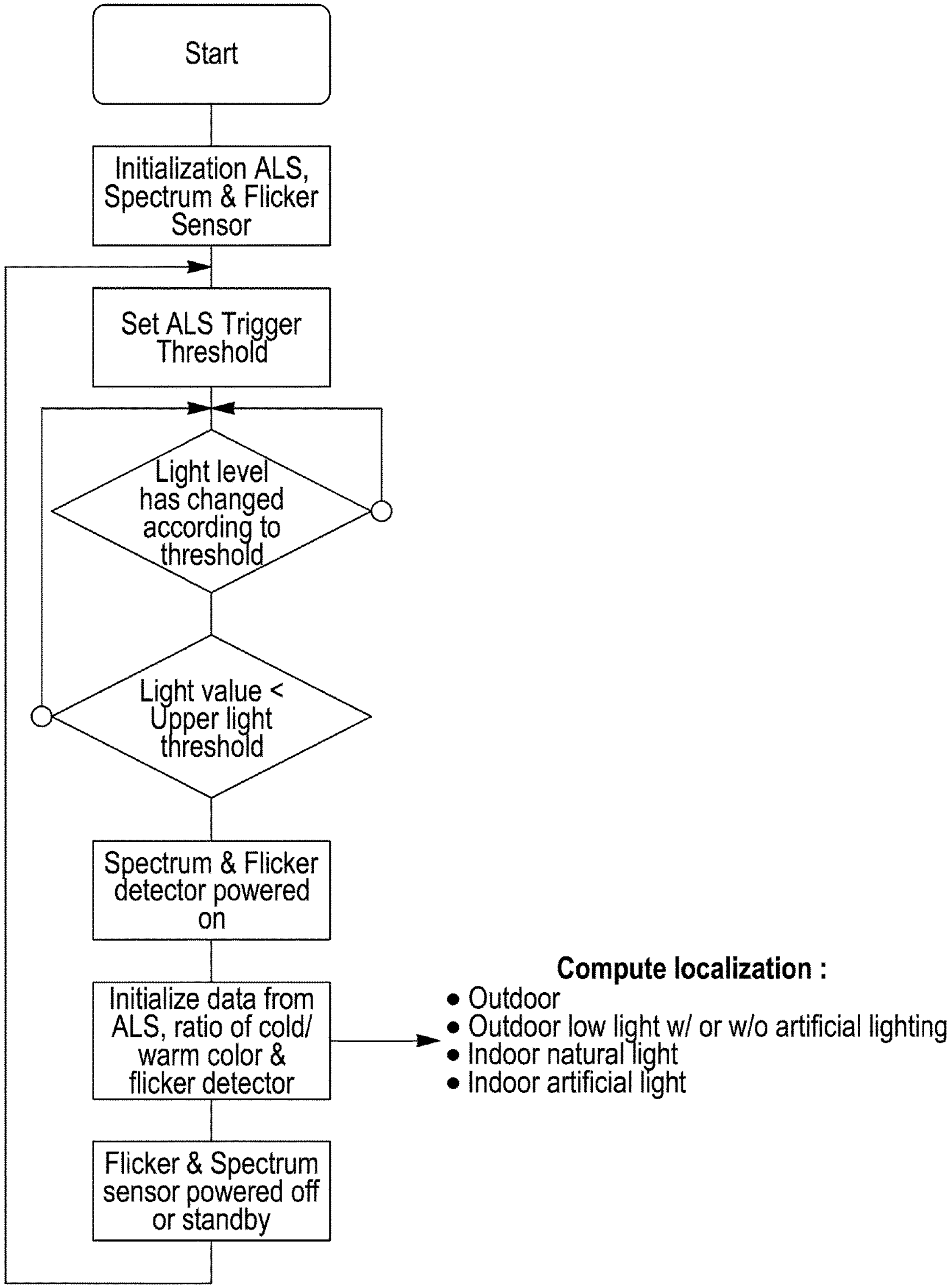

[Fig. 12a]
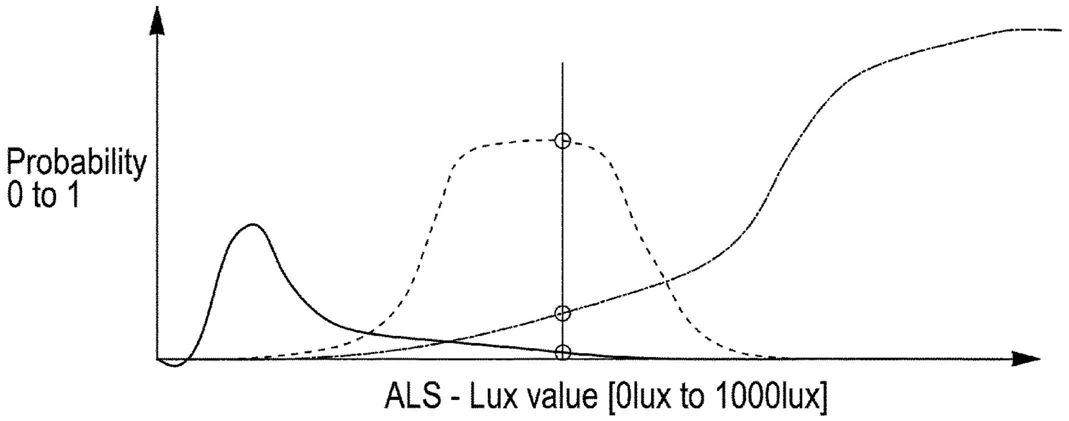
[Fig. 12b]
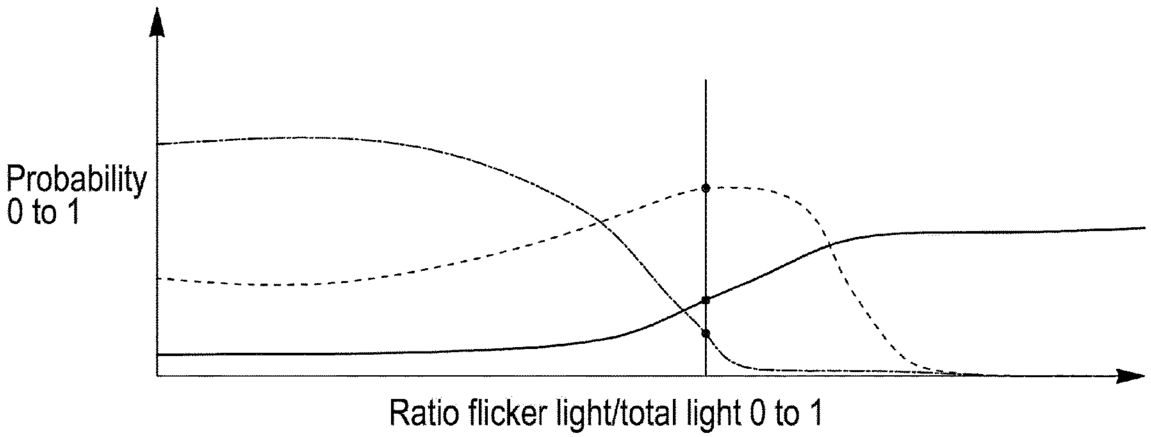
[Fig. 12c]
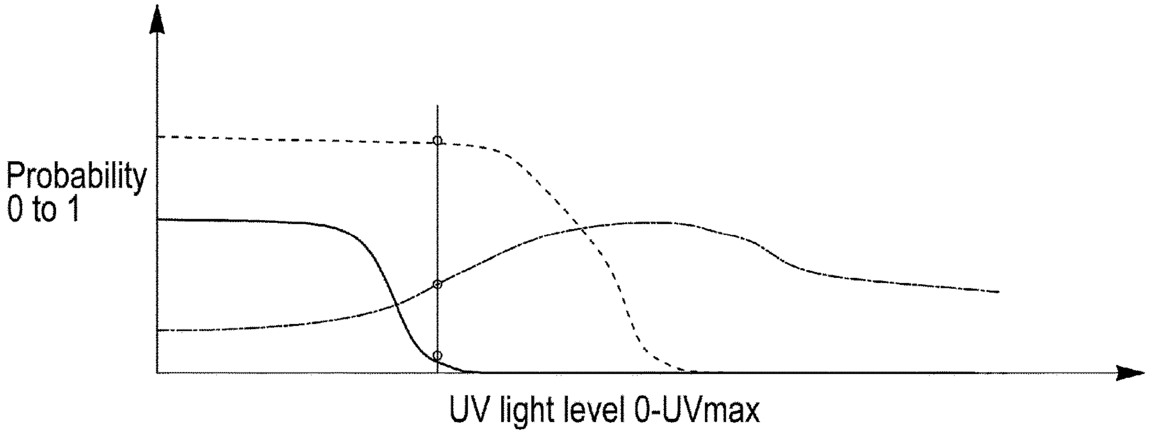

CALCULATION MODULE FOR DETERMINING A LOCALIZATION, SYSTEM, EYEWEAR AND COMPUTER IMPLEMENTED METHOD

FIELD

Various aspects of this disclosure generally relate to the field of the determination of a localization of an optical device.

BACKGROUND

Eyewear and eyeglasses are examples of optical devices. Smart eyewear or eyeglasses are a specific type of eyewear or eyeglasses comprising active lenses and an electronic module. The electronic module can control the active lenses. Active lenses are lenses for which their physical parameters (for example, transmission coefficient or reflection coefficient) can be modified on demand. Generally, active lenses are powered by electricity, and the modification of the current or voltage powering the active lenses will modify these physical parameters.

The smart eyewear can also be used for determining time spent outdoors for children (for myopia control purpose), or to activate specific functions (for instance for low vision, visual aid may be activated only when outdoors). In this case the smart eyewear can comprise regular non active lenses.

To collect data or adapt the physical parameters, determine time spent outdoors or activate specific functions, the eyewear needs to obtain information representing the environment surrounding the user wearing the eyewear. For example, the eyewear needs to know when the user wearing the eyewear is indoors or outdoors.

This differentiation between indoors and outdoors can be realized using an Ambient Light Sensor ALS and/or an UltraViolet UV sensor. However, this combination of sensors only provides accurate differentiation when sufficient ultraviolet rays are present in the environment. Consequently, this solution may not work everywhere and is depending upon the seasonality.

Therefore, there is a need for a new calculation module or eyewear that can accurately distinguish indoor from outdoor conditions in any situation and location at any time of the day, at any weather and seasonality condition.

SUMMARY

The following presents a simplified summary in order to provide a basic understanding of various aspects of this disclosure. This summary is not an extensive overview of all contemplated aspects and is intended to neither identify key or critical elements of all aspects nor delineate the scope of any or all aspects. The sole purpose is to present some concepts of one or more aspects in a simplified form as a prelude to the more detailed description that is presented later.

One aspect of this disclosure is a calculation module for determining a localization of an optical device. The calculation module is configured to receive, from a spectrophotometer of the optical device, data representing a power density of at least two spectral components of the light received by the spectrophotometer and to determine the localization using the power density of the at least two spectral components.

This calculation module allows the detection of the localization of the eyewear, more specifically detection between indoor and outdoor localization.

This calculation modules allows at least three types of functionalities:

1. the reinforcement of discrimination from indoor to outdoor localization
2. the detection of a user localization upon the signature of the artificial light he is immersed into (office, home, etc . . . )
3. the detection of punctual artificial light such as car lights Furthermore, this calculation module meets smart frames integration constraints such as a low power requirement and a small mechanical volume available. It also provides a way to detect specific artificial lightning patterns to recognize and to set specific actions upon the already recognized patterns.

One other aspect of this disclosure is an eyewear. The eyewear comprises a spectrophotometer and a calculation module for determining a localization. The calculation module is configured to receive, from the spectrophotometer, data representing a power density of at least two spectral components of the light received by the spectrophotometer and to determine the localization using the power density of the at least two spectral components.

One other aspect of this disclosure is a system comprising an eyewear and a portable device. The eyewear comprises the spectrophotometer. The portable device comprises a calculation module for determining a localization. The calculation module is configured to receive, from a spectrophotometer, data representing a power density of at least two spectral components of the light received by the spectrophotometer and to determine the localization using the power density of the at least two spectral components.

One other aspect of this disclosure is a computer implemented method for determining a localization of an optical device. The method comprises a step of receiving, from a spectrophotometer of the optical device data representing a power density of at least two spectral components of the light received by the spectrophotometer and a step of determining the localization using the power density of the at least two spectral components.

DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 1 represents the system.

FIG. 2 represents the optical device

FIG. 5 represents the optical device comprising a removable clip.

FIG. 6 represents the method for determining a localization.

FIG. 7 represents the ratio of cold/warm color depending on light context.

FIG. 8 represents another embodiment of the method for determining the localization.

Figure 3:
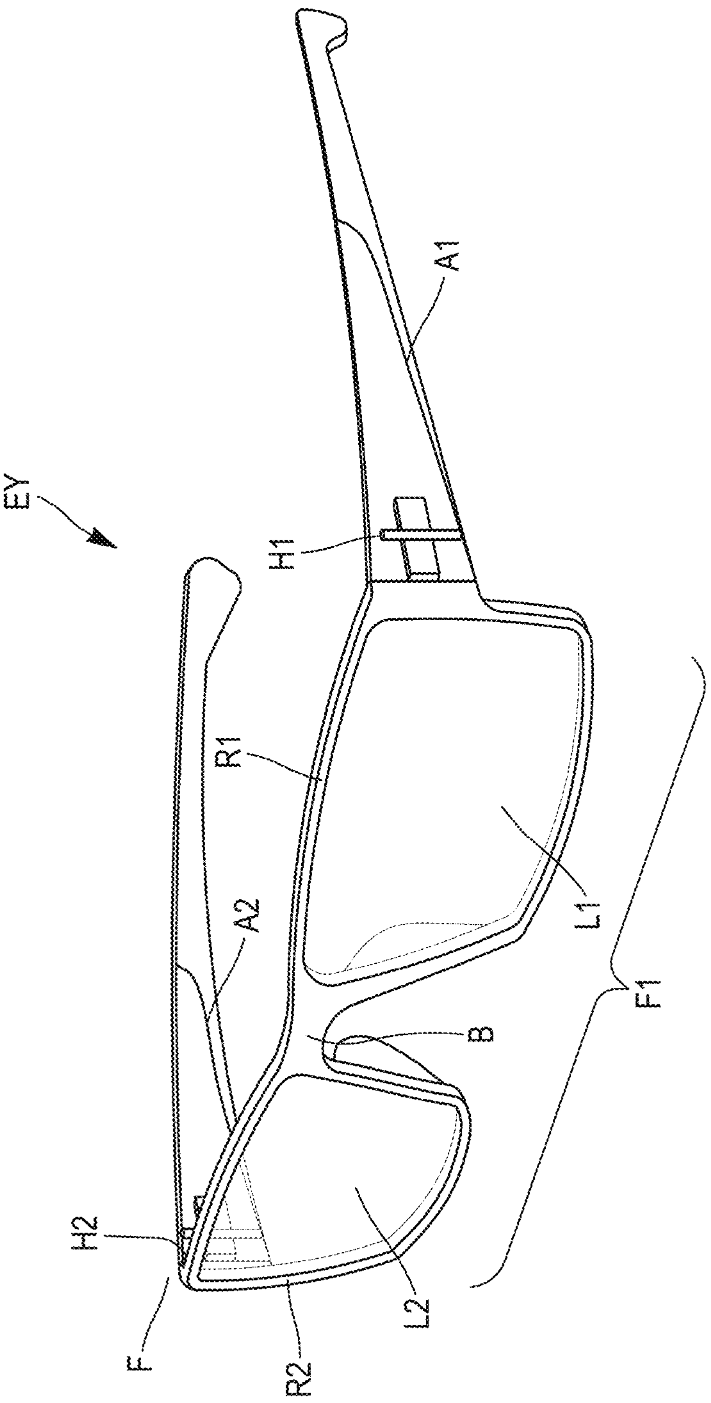
FIG. 3 represents the eyewear.

The FIG. 9-*a* to 9-*c* represent the Fourier transform of different light sources.

FIG. 10 represents another embodiment of the method for determining the localization.

FIG. 11 represents in another way the method for determining the localization The FIG. 12-*a* to 12-*c* represent the evolution of values of different parameters, for different situations.

DETAILED DESCRIPTION OF EMBODIMENTS

The detailed description set forth below in connection with the appended drawings is intended as a description of various possible embodiments and is not intended to represent the only embodiments in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

FIG. 1 represents a system 101 comprising an optical device 102 and a calculation module 103.

The optical device 102 comprises a spectrophotometer 102-*a* and can also comprise a light sensor 102-*b*, for example an Ambient Light Sensor ALS or an ultraviolet sensor. The spectrophotometer is a device that precisely measures electromagnetic energy at specific wavelengths of lights. In embodiments, the optical device can comprise two light sensors 102-*b*, one being an Ambient Light Sensor ALS and the other an ultraviolet sensor.

One can use a spectrophotometer on which the two channels used to determine the power density of respectively the first and the second of the two spectral components are calibrated together. Therefore, the ratio between the power densities will not depend on the spectrophotometer.

The power density may be obtained by integrated the power of the light received in the first and the second of the two spectral components.

The aim of this calibration may be to have an identical gain or detection sensitivity for both channels.

This calibration may be realized by placing the spectrophotometer in front of a solar source.

To allow an easier calibration the two channels of the spectrophotometer may be implemented on the same die.

Once integrated into the sensor's casing, each channel is further calibrated to compensate for any remaining offset.

Therefore, the ratio between the powers of the different channels will always be equal when illuminated by an identical light stimulus.

In some embodiments, the optical device 102 comprises an accelerometer 102-*c* to detect an acceleration of the optical device 102. The accelerometer 102-*c* can be a part of an inertial measurement unit (IMU).

The calculation module 103 can be an independent module, for example, a smartphone or a computer. The calculation module 103 can also be a virtual machine located on a cloud network or a server not co-located with the user of the system 101.

In an embodiment presented FIG. 2 the optical device 102 comprises the calculation module 103.

The calculation module 103 comprises a memory 103-*a* and a processor 103-*b*.

Examples of processors 103-*b* include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure.

The memory 103-*a* is computer-readable media. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by the processor 303-*a* of the calculation module 303.

The FIG. 3 represents an eyewear EY, which is an example of the optical device 102. This eyewear EY comprises two lenses L1 and L2 and a frame F. The frame F comprises two arms or temples A1 and A2 and a front part F1. The front part F1 comprises a right rim R1 and left rim R2 linked together by a bridge B. The front part F1 and the two arms A1 and A2 are linked using two hinges H1 and H2. The hinges H1 and H2 allow the user to fold the arms A1 and A2 along the front part F1. The rims R1 and R2 of the frame F1 are configured to receive and to maintain the lenses L1 and L2. One or both of the lenses L1 or L2 can be an electrochromic lens on which the transmission or the reflection can be controlled.

Figure 4:
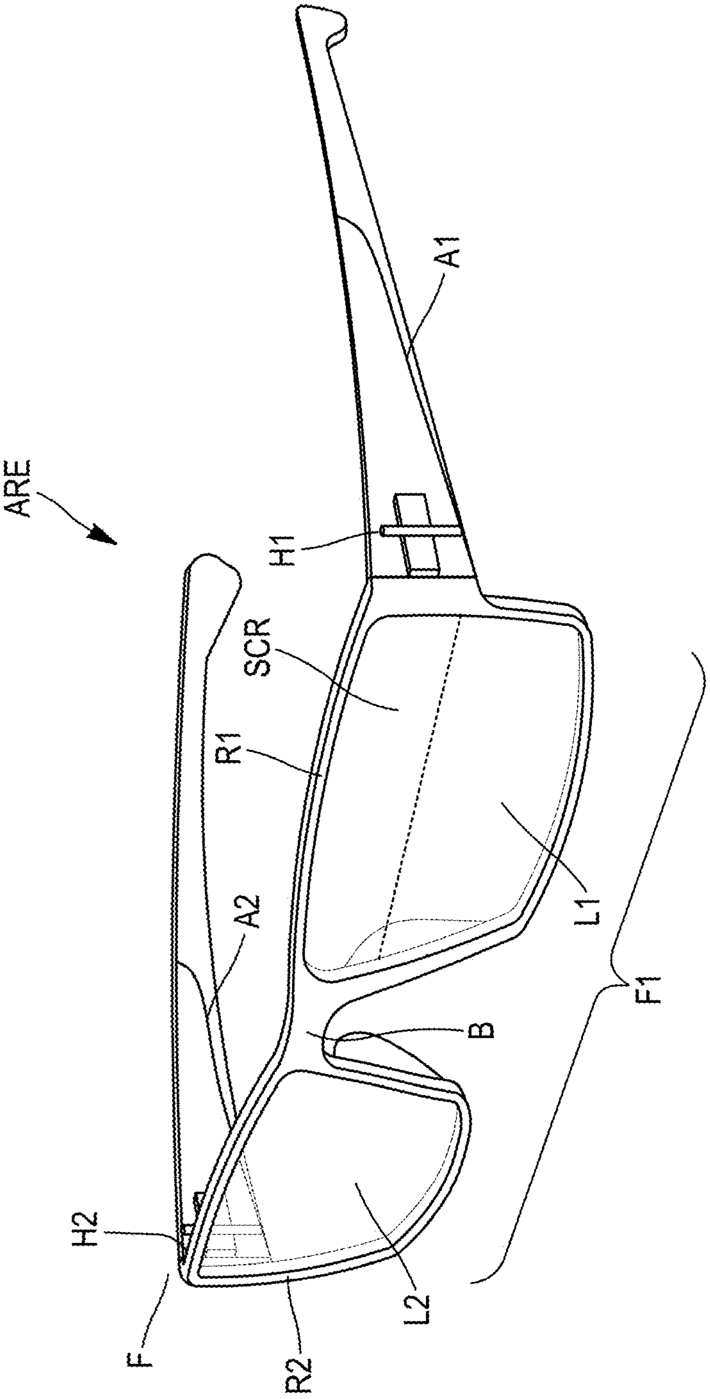
FIG. 4 represents the augmented reality eyewear.

The FIG. 4 represents augmented reality eyewear ARE, which is another example of the optical device 102. This augmented reality eyewear ARE comprises also two lenses L1 and L2 and a frame F. The frame F comprises two arms or temples A1 and A2 and a front part F1. The front part F1 comprises a right rim R1 and left rim R2 linked together by a bridge B. The front part F1 and the two arms A1 and A2 are linked using two hinges H1 and H2. The hinges H1 and H2 allow the user to fold the arms A1 and A2 along the front part F1. The rims R1 and R2 of the frame F1 are configured to receive and to maintain the lenses L1 and L2. Furthermore, the augmented reality eyewear ARE comprises a screen SCR, generally a see-through display or transparent display.

In an embodiment, represented FIG. 5, the optical device 102 comprises a removable clip CLP. This removable clip CLP comprises the calculation module 103, the spectrophotometer 102-*a*, the light sensor 102-*b* and the accelerometer 102-*c*.

The memory 103-*a* is configured to store a computer program comprising instructions which, when the program is executed by the processor 103-*b*, cause the calculation module 103 to carry out a method for determining a localization of the optical device 102. This method is represented in FIG. 6 and comprises:

- A step of receiving 501, from the spectrophotometer 102-*a* of the optical device 102, data representing a power density of at least two spectral components of a received light,
- A step of determining 502 the localization using the power density of the at least two spectral components.

The step of determining 502 the localization allows the determination of whether the optical device 102 is located indoors or outdoors.

In an embodiment, the calculation module 103 is configured to determine the localization using also a model trained with a set of model data comprising the power density of the at least two spectral components of the light associated with a localization (indoors or outdoors). The set of model data can comprise data related to the light spectrum and data obtained from weather stations.

In another embodiment, the calculation module 103 is configured to determine the localization also by determining a ratio of a power density of a first of the at least two spectral components and a power density of a second of the at least two spectral components and by comparing the ratio with a threshold.

The first of the at least two spectral components is between 400 nm and 535 nm, the second of the at least two spectral components is between 536 nm and 704 nm. The threshold is between 0.5 and 0.7 for example between 0.55 and 0.65 more precisely 0.6. The localization is outdoor when the ratio is above the threshold and the localization is indoor when the ratio is below the threshold.

In other words we divide the visible spectrum in two parts, the first group spreading from the purple: beginning at 400 nm to the green ending at 535 nm and the second group the yellow-green beginning at 535 nm to the red ending at 704 nm and by applying the ratio between the irradiance of the first and the second group, a cold over warm colors indicator is set.

FIG. 7 represents the ratio of cold/warm color depending on light context (indoor or outdoor). This ratio represents an indicator to discriminate whether the wearer is localized outside or inside and more precisely to evaluate the topology of the outdoor surroundings such as urban or not urban and the indoor light source such as natural or artificial. The threshold value of the indicator is defined within the scope of a specific set of sensor integration, the threshold value is between 0.5 and 0.7 for example between 0.55 and 0.65 more precisely 0.6, considering that what is above is considered as an indoor situation and what is below is considered as an outdoor situation. This value could also evolve using data provided by the user during a feedback. Thus, this value may be learned through the use and data feedback that could confirm the correct distinction between inside and outside.

The FIG. 8 represents another embodiment of the method for determining the localization of the optical device 102. In this embodiment, the method also comprises:

- a step of receiving 601, from the light sensor 102-*b* of the optical device 102, second data representing a temporal evolution of the amount of the received light,
- a step of determining a Fourier transform 602 of the second data,
- a step of determining a frequency 603 associated with at least one peak in the Fourier transform.

The step of determining the localization 502 is also using the frequency.

In some embodiments, a sensor called a flickering detector is used. This sensor comprises the light sensor 102-*b* and a dedicated calculation module configured to:

- receive 601, from the light sensor 102-*b*, second data representing a temporal evolution of the amount of the received light,
- determine a Fourier transform 602 of the second data,
- determine a frequency 603 associated with at least one peak in the Fourier transform.

The step of determining the localization 502 also comprises the comparison of the frequency of the peak of the Fourier transform with a predetermined range. The predetermined range can be between 50 Hz and 150 Hz and corresponds to the flickering frequency of most commercially available indoor light sources. Advantageously this frequency range can be between 75 Hz and 125 Hz for example 100 Hz. The localization is indoor when the frequency is in the predetermined range and the localization is outdoor otherwise.

In other embodiments a plurality of frequencies are determined and these frequencies are compared with the predetermined range of frequencies or with a plurality of predetermined ranges of frequencies.

In other words, a detection of the indoor or outdoor localization can be realized using a flickering detector. Most of the commercially available indoor light sources generate light via a succession of impulsions at constant frequency, or frequencies when harmonics are present, where main frequency is high enough (typically >50 Hz) not to disturb the user thanks to the retinal persistence. If the frequency of these impulsions is high enough the user will not be disturbed by these impulsions because human photoreceptors have lower functioning frequency. When we detect that the light has impulsions, we can consider with high likelihood that the optical device 102 is located indoors.

The FIG. 9-*a* represents using dashed line the temporal evolution of the light emitted by a halogen lamp without dimming and in the bottom part the Fourier transform of this temporal evolution. The main harmonic of the Fourier transform is around 100 Hertz with a relative amplitude of 185.

The FIG. 9-*b* represents using dashed line the temporal evolution of the light emitted by a halogen lamp with dimming and in the bottom part the Fourier transform of this temporal evolution. The main harmonic of the Fourier transform is still around 100 Hertz with a reduced amplitude of about 135. Furthermore, it also shows 2nd, 3rd, 4th harmonics with lower amplitude relative due to the dimming mechanism of the halogen lamp.

The FIG. 9-*c* represents using dashed line the temporal evolution of the light emitted by a led light source and in the bottom part the Fourier transform of this temporal evolution. The main harmonic of the Fourier transform is centered around 100 Hertz and has an amplitude of approximately 175.

Using this embodiment, it is possible to detect if the optical device 102 is close to an artificial light source. Using the frequency associated with the peaks of the Fourier transform it is also possible to determine the kind of the light source (halogen, Led, etc . . . ). The frequency spectrum associated with various scenes could also be used to fill a database of spectrum signals over specific localization. This database could be used later on to distinguish between different situations.

The addition of the data coming from the spectrophotometer 102-*a* with the Fourier transform of the signal received from the light sensor 102-*b* reinforces the detection ability by bringing more parameters to characterize the light source (for example detecting specific lighting upon their characteristic light pattern).

FIG. 10 represents another embodiment of the method for determining the localization of the optical device 102. In this embodiment the method comprises:

- a step of detecting 901 a modification of an amount of the light received by the light sensor, and when the modification is detected:

- a step of turning on 902 the spectrophotometer,
- a step of determining the localization 502 using the first data received from the spectrophotometer 102-*a* and the second data received from the light sensor 102-*b*.

The step of determining the localization 502 can be realized as presented above.

The method of the FIG. 10 has the advantage of maximizing the autonomy of the optical device 102 by minimizing its electrical consumption. The light sensor 102-*b* (ALS) needs less electricity power to function than the spectrophotometer 102-*a*. This light sensor 102-*b* is the only sensor that is always powered on. The spectrophotometer 102-*a* is most of the time turned off and only powered on once a modification in the measured light is detected by the light sensor 102-*b*. Once the modification has been observed in the light environment, the spectrophotometer 102-*a* is powered on to start acquiring data. The method can also comprise a step of modification of the wake-up threshold. For example this wake-up threshold could depend on the percentage of increase or decrease of the light received by the light sensor 102-*b*. For an increase of more than 25% or 50%, the spectrophotometer 102-*a* is turned on.

In an embodiment when the measured light is above "Upper Light Value Threshold" the light condition is too sunny to be indoor, therefore, the spectrophotometer 102-*a* stays in low power or off mode to avoid additional power consumption.

The combined data from the light sensor 102-*b* and the ratio from the cold/warm colors obtained from the spectrophotometer 102-*a* can be used to detect if the user is outdoor or indoor. Given the analysis of the light condition, the algorithm could further detect if the user is located outdoors in an urban environment or in clear landscape or at low natural light conditions in presence of artificial lighting. The decision algorithm can also detect if the user is inside in presence of natural or artificial light or both. The artificial light can be detected by the ratio of the cold/warm colors and reinforced by a method to obtain the Fourier transform of the temporal evolution of the amount of the received light by the light sensor 102-*b*.

Then using the methods of this divulgation it is then possible to detect the localization of the wearer and more precisely if he's in presence of natural and/or artificial light in any seasonality or weather conditions and location on Earth.

The discrimination of indoors from outdoors could also lead to detect a situation where a wearer may be in a vehicle, because the car windows also cut the UV. But the UV spectral density information is not sufficient to detect this kind of activity.

In this case the use of the accelerometer 102-*c* and a specific algorithm processing the data coming from the accelerometer 102-*c* allows the detection of specific driving/transportation conditions.

To save energy, in an embodiment, a start condition triggers the turn on of the accelerator 102-*c* and the acquisition and processing of the data coming from the accelerator 102-*c*.

This start condition can be the detection of reduced amount or no UV radiations added to the detection of outdoor conditions provided by the ratio of cold/warm colors.

FIG. 11 represents in another way the method for determining the localization of the optical device 102.

In some embodiments the calculation module 103 is configured to use the artificial light signature of transportation means (train, subway, plane, wearer's own vehicle), to more precisely determine the localization.

In an embodiment the calculation module is configured to:

determine that the user is driving or is simply in a car, use the flickering detector to detect opposite car lights coming ahead. The intensity of the flickering signal could be compared to the one of a regular light sensor. This regular light sensor gives an absolute value of the luminosity amplitude that is oriented toward the user.

The dynamic of the signal coming from the flickering detector is directly linked to artificial light sources while the data coming from the regular light sensor includes all kinds of lights. Thus, an increasing or decreasing amplitude of the signal coming from the flickering detector may be compared to the dynamic of one of the regular light sensors to detect opposite car lights regardless of the natural outdoor light amplitude.

Using this embodiment, the optical device 102 can give to the user the best optical contrast while he is driving, using for example active lenses that embeds a specific filter, either a colored one or a tinted. For example, these filters will not be activated, resulting in clear glasses, until a light source that might annoy the driver is detected.

The specific signature of the artificial light could also be detected given the data coming from the ALS, the spectrophotometer, and the flickering detector. For example, the output of the sensor fusion could lead to detecting if a person is located inside near a window or completely away from any windows.

In an environment subjected to a monochromatic environment, the ratio cold color/warm color indicates an outlier. We can therefore deduce that the user is indoors only using the spectrophotometer.

Comparing the data that comes from the ALS and the ultraviolet sensor, it is also possible to detect the position of the user in regard to the sun. Indeed, the reflectance of ultraviolet is quite low for most of landscapes (except for snow & sand) whereas the one of luminance is higher, then a ratio of the luminance over the ultraviolet could indicate at least if the wearer looks toward the sun or if he's behind it.

Given the fusion of ALS, flickering detector and also the spectrum analysis, it is also possible to detect outdoor artificial lights at night (low overall luminosity but high spectrum signal from the flickering detector).

According to an embodiment, the calculation module 103 can detect the signature flickering of artificial lighting. Using this signature it is then possible to detect that the user is located outdoors at night with artificial lighting. This signature can be based on the specific spectrum corresponding to artificial lighting such as Neon/LED/Incandescent. As shown in FIG. 9, artificial lighting could be detected by the flickering detector, because the signal is modulated by a dimmer. So the flicker detector will detect a series of specific harmonics that will never appear in the case of natural lights.

In some other embodiments the method for determining a localization can be realized by:

Determining an amount of light received, for example using the ALS

When the amount of light received is above a threshold:

Determining a ratio between an amount of UVA received and an amount of UVB received, When the ratio is bigger than a UV ratio threshold the user is located outdoors, and when the ratio is smaller than the UV ratio threshold the user is located indoors.

More precisely we can compare the ratio between UVA and visible light and/or between UVB and visible light to the UV ratio threshold. The use of the ratio between UVB and visible light allows a better discrimination between indoors situations and outdoors situations. The UV ratio threshold can be set to 0.005.

In another embodiment, the ratio is compared to an unconfident range of UV ratio threshold.

When the ratio is bigger than a higher limit of the range the user is located outdoors.

When the ratio is smaller than a lower limit of the range, the user is located indoors.

When the ratio is in between the lower limit and the higher limit the optical device 102 is configured to use the spectrophotometer and the flickering detector to mitigate between indoors and outdoors. For example, the flickering detector can measure a signal matching with artificial lighting and/or the spectrum ratio obtained by the spectrophotometer has a value that indicates indoor situation or outdoor situation. The flickering detector can also discriminate driving situations.

In other embodiment, when the amount of UVA received is not enough to obtain a meaningful ratio UVA versus UVB but the amount of light received is above a threshold, the optical device 102 or the calculation module 103 are configured to turn on the flickering detector and/or the spectrum detector to evaluate indoor from outdoor conditions.

In an embodiment, the method of determining the localization comprises:

- A step of defining a list of possible localizations characterized by the situations (including indoor/outdoor situation etc . . . see above)
- A step of associating each of the situations with values of a plurality of parameters. These parameters are parameters related to light level (for example obtained by the ALS and the light sensor 102-*b*), to ultraviolet light level (for example obtained by the UV light sensor), to spectral light relative distribution (for example obtained by the spectrophotometer), to flickering of the light (for example obtained by the flickering detector), For data related to the flickering of the light data, we can define parameters as being ratio of flickering light/total light, or flickering intensity for specific ranges of frequencies.

For each of these parameters and for each situation, the method comprises a step of assigning a probability curve giving the probability to have the parameter current value for a given situation.

The FIGS. 12-*a* to 12-*c* represent the evolution of these parameters, for different situations. In these figures, the blue curve represents the evolution of the values of the parameters for a day outdoors situation. The red curve represents the evolution of the values of the parameters for night driving situations. The green curve represents the evolution of the values of the parameters for indoor situations.

The FIG. 12-*a* represents the evolution of the probability of light level.

The FIG. 12-*b* represents the evolution of the probability of the ratio between the amount of flickered light and the total amount of light.

The FIG. 12-*a* represents the evolution of the probability ultraviolet light level.

The method comprises eventually a step of summing the probability for each possible situation and deciding the right situation as the one giving the highest summed probability.

In other embodiments the method is implemented by machine learning to learn how to relate parameters value with situations.

The invention claimed is:

1. A calculation module for determining a localization of an optical device, the calculation module comprising:

processing circuitry configured to receive, from a spectrophotometer of the optical device, data representing a power density of at least two spectral components of light received by the spectrophotometer, and to determine the localization of the optical device using the power density of the at least two spectral components, wherein the processing circuitry is configured to determine the localization of the optical device also by determining a ratio of a power density of a first of the at least two spectral components and a power density of a second of the at least two spectral components and by comparing the ratio with a threshold, a first of the at least two spectral components is between 400 nm and 535 nm, a second of the at least two spectral components is between 536 nm and 704 nm, the threshold is between 0.5 and 0.7, and the localization of the optical device is outdoors when the ratio is above the threshold, and the localization of the optical device is indoors when the ratio is below the threshold.

2. The calculation module according to claim 1, wherein the data is first data, and the processing circuitry is configured:

to receive, from a light sensor of the optical device, second data representing a temporal evolution of an amount of the light received by the light sensor, to determine a Fourier transform of the second data, to determine a frequency associated with at least one peak in the Fourier transform, and to determine the localization also using the frequency.

3. The calculation module according to claim 2, wherein the processing circuitry is configured to compare the frequency with a predetermined range.

4. The calculation module according to claim 3, wherein the processing circuitry is configured:

to detect a modification of an amount of the light received by the light sensor, and when the modification is detected, the processing circuitry is also configured:

to turn on the spectrophotometer, and to determine the localization using the first data received from the spectrophotometer and the second data received from the light sensor.

5. The calculation module according to claim 1, wherein the processing circuitry is configured to determine the localization using also a model trained with a set of model data comprising the power density of the at least two spectral components of the light associated with a localization.

6. The calculation module according to claim 1, wherein the threshold is between 0.55 and 0.65.

7. Eyewear, comprising:

a spectrophotometer; and a processing circuitry configured to determine a localization of the eyewear, the processing circuitry being configured:

to receive, from the spectrophotometer, data representing a power density of at least two spectral components of light received by the spectrophotometer, and to determine the localization of the eyewear using the power density of the at least two spectral components, wherein the processing circuitry is configured to determine the localization of the eyewear also by determining a ratio of a power density of a first of the at least two spectral components and a power density of a second of the at least two spectral components and by comparing the ratio with a threshold, a first of the at least two spectral components is between 400 nm and 535 nm, a second of the at least two spectral components is between 536 nm and 704 nm, the threshold is between 0.5 and 0.7, and the localization of the eyewear is outdoors when the ratio is above the threshold, and the localization of the eyewear is indoors when the ratio is below the threshold.

8. A system comprising:

eyewear; and a portable device, the eyewear comprising a spectrophotometer, and the portable device comprising a processing circuitry configured to determine a localization of the eyewear, the processing circuitry being configured:

to receive, from the spectrophotometer, data representing a power density of at least two spectral components of light received by the spectrophotometer, and to determine the localization of the eyewear using the power density of the at least two spectral components, wherein the processing circuitry is configured to determine the localization of the eyewear also by determining a ratio of a power density of a first of the at least two spectral components and a power density of a second of the at least two spectral components and by comparing the ratio with a threshold, a first of the at least two spectral components is between 400 nm and 535 nm, a second of the at least two spectral components is between 536 nm and 704 nm, the threshold is between 0.5 and 0.7, and the localization of the eyewear is outdoors when the ratio is above the threshold, and the localization of the eyewear is indoors when the ratio is below the threshold.

9. A computer implemented method for determining a localization of an optical device, comprising:

receiving, from a spectrophotometer of the optical device, data representing a power density of at least two spectral components of light received by the spectrophotometer; and determining the localization of the optical device using the power density of the at least two spectral components, wherein the determining the localization of the optical device comprises a determination of a ratio of a power density of a first of the at least two spectral components and a power density of a second of the at least two spectral components and by comparing the ratio with at least one threshold, a first spectral component is between 400 nm and 535 nm, a second spectral component is between 536 nm and 704 nm, the threshold is between 0.5 and 0.7, and the localization of the optical device is outdoor when the ratio is above the threshold, and the localization of the optical device is indoor when the ratio is below the threshold.

10. The method according to claim 9, wherein the data is first data, the method further comprises:

receiving, from a light sensor of the optical device, second data representing a temporal evolution of an amount of the light received by the light sensor;

determining a Fourier transform of the second data; and determining a frequency associated with at least one peak in the Fourier transform, and the determining the localization also uses the frequency.

11. The method according to claim 10, further comprising:

detecting a modification of the amount of the light received by the light sensor; and when the modification is detected:

turning on the spectrophotometer, wherein the determining the localization also uses the first data received from the spectrophotometer and the second data received from the light sensor.

12. The method according to claim 9, wherein the determining the localization also uses a model trained with a set of model data comprising the power density of the at least two spectral components of the light associated with a localization.

* * * * *